J. W. Doty.
Harvester Pitman.
No. 59,192. Patented Oct. 30, 1866.

Witnesses
Theo. Tusch
J. A. Servis

Inventor
J. W. Doty
Per Munn & Co
Attorneys

UNITED STATES PATENT OFFICE.

J. W. DOTY, OF LOCKPORT, NEW YORK.

IMPROVEMENT IN PITMEN FOR HARVESTERS, &c.

Specification forming part of Letters Patent No. 59,192, dated October 30, 1866.

*To all whom it may concern:*

Be it known that I, J. W. DOTY, of Lockport, in the county of Niagara and State of New York, have invented a new and useful Improvement in Pitmen for Driving the Sickles of Grain and Grass Harvesters; and I do hereby declare that the following is a full, clear, and exact description thereof, which will enable others skilled in the art to make and use the same, reference being had to the accompanying drawings, forming part of this specification, in which—

Figure 4:
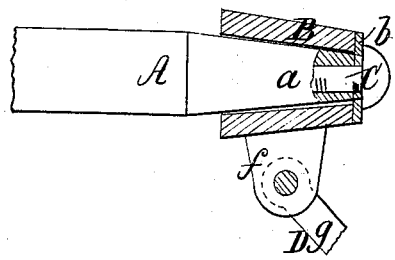
Figure 1:
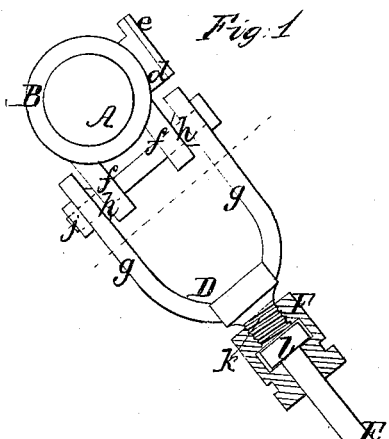
Figure 2:
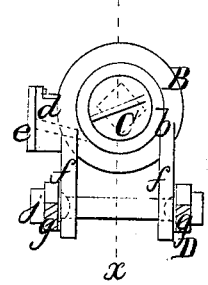
Figure 3:
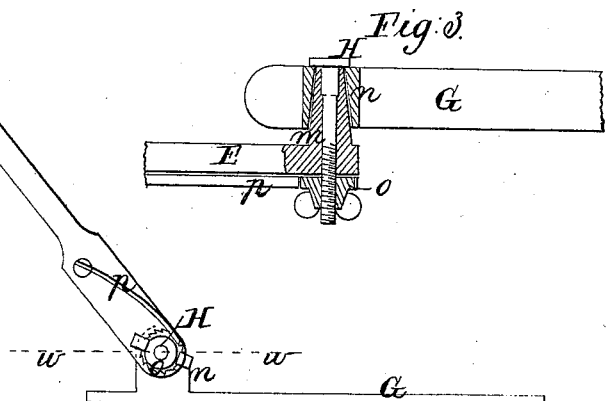

Figure 1 is a side view of my invention, partly in section; Fig. 2, an end view of the wrist-pin and box; Fig. 3, a section of the joint which connects the pitman with the cutter-bar, taken in the line $y\,y$, Fig. 1; Fig. 4, a section of the wrist-pin and box, taken in the line $x\,x$, Fig. 2.

Similar letters of reference indicate like parts.

This invention relates to a new and useful improvement in pitmen for driving the sickles of grain and grass harvesters; and has for its object the obviating of wear and tear and jars and concussions produced by unnecessary play at the points of connection, as well as the obviating of undue friction and breakage caused by the pitman getting out of line with the wrist-pin and cutter-bar.

A represents a wrist-pin, which may be of steel or chilled cast-iron, made separately, and fitted to the fly-wheel in any proper manner. The outer part, $a$, of the wrist-pin is of taper, spherical, or conical form, to receive a box, B, having a conical interior to correspond to the conical part $a$ of the wrist-pin.

The box is secured on the wrist-pin by means of a screw, C, and a washer, $b$, the latter being fitted on a square on the end of the wrist-pin, and the washer retained in place by the head of the screws, the body of the latter being screwed into the end of the wrist-pin. By this arrangement it will be seen that the box B may always be made to fit snugly on the wrist-pin, wear being compensated for by screwing up the screw C.

The box B is cast with a lateral projection, $d$, drilled to form an oil passage or chamber, which may have a sponge or any absorbent material fitted within it, saturated with oil, a cover, $e$, being fitted to the outer end of $d$, to prevent the escape of the lubricating-sponge. By this means the wrist-pin may always be kept in a proper lubricated state.

The box B is also cast with the pendent ears or lugs $f\,f$, to which the head D of the pitman E is attached, as follows: The pitman-head is composed of two prongs, $g\,g$, the inner surface of the outer ends of which are provided with semi-spherical projections $h\,h$, which fit in corresponding cavities in the outer sides of the ears or lugs $f\,f$, a screw-bolt, $j$, passing through the ears or lugs and the projections $h\,h$ of the prongs $g\,g$ of the pitman D, as seen in Fig. 2.

The pitman-head has a screw, $k$, at its outer end, and the pitman E is connected to the head D by means of a nut, F, into which the screw $k$ is fitted, the end of the pitman being provided with a head, $l$, which works in a recess in the nut, forming a swivel-connection.

The lower end of the pitman is provided with a lateral conical or spherical projection, $m$, on which a socket, $n$, on the cutter-bar G is fitted, said socket having a conical interior corresponding to the projection $m$.

H is a screw-bolt, which passes through the conical projection $m$, and has a nut, $o$, on its end, provided with a ratchet, into which a pawl, $p$, attached to the pitman, catches. This pawl and ratchet prevents the nuts from unscrewing or working off from the bolt H.

The socket $n$, it will be seen, may be tightened up on the projection $m$ by screwing up the nut $o$.

By this arrangement the pitman may be made to work without any play or rattling noise, and much wear and tear avoided, as well as friction and liability to breakage.

The box B may be made in one piece, or may be made in two parts.

What I claim as new, and desire to secure by Letters Patent, is—

1. The combination of the forked or pronged pitman-head D, secured to the ears or lugs $f\,f$ by a screw-bolt, $j$, taper, conical, or spherical wrist-pin A, and box B, the whole arranged substantially in the manner and for the purpose set forth.

2. The tubular conical projection $m$ at the lower end of the pitman E, in combination with the socket $n$ on the cutter-bar G, the bolt H, provided with a nut, $o$, having a ratchet attached, with which a pawl, $p$, on the pitman engages, substantially as and for purpose specified.

The above specification of my invention signed by me this 21st day of September, 1866.

J. W. DOTY.

Witnesses:
E. A. HOLT,
JAS. ATWATER.